United States Patent Office 2,736,731
Patented Feb. 28, 1956

2,736,731

DYES OF THE ANTHRAQUINONE SERIES WHICH ARE FAST TO MILLING AND PROCESS FOR THEIR PREPARATION

Albin Peter and Erhard Wydler, Basel, Switzerland, assignors to Sandoz A. G., Basel, Switzerland, a Swiss firm No Drawing. Application April 27, 1953,
Serial No. 351,482

Claims priority, application Switzerland May 9, 1952

10 Claims. (Cl. 260—374)

Dyestuffs derived from 1,4-di-(phenylamino)-anthraquinone containing sulfonic acid groups and halogen atoms on the benzene nuclei have been described in U. S. Patent No. 2,226,909. They are prepared by the halogenation of the diphenylamino-anthraquinones and subsequent sulfonation of the reaction product. No process has, however, heretofore been known for introducing halogen atoms into the already sulfonated benzene nuclei.

According to the present invention it has now been found that this is possible in one clearly defined case, namely that in which the aforesaid benzene nuclei contain an alkyl substituent in each of the 2'-, 4'- and 6'-positions. It is possible in this case first to introduce a sulfonic acid group into the 3'- or 5'-position and thereupon to replace the hydrogen atom in the last free position by a halogen atom. This method of working makes possible the preparation of new dyestuffs which dye nitrogenous fibers such as wool, silk, tussah, nylon, Perlon, and the like, and which exhibit in this connection an outstanding power of exhaustion from neutral baths. Furthermore, they have a reserving action to cotton and their dyeings are outstandingly fast to fulling and to light.

The present invention therefore relates to the thus-prepared fulling dyestuffs of the anthraquinone series as well as to the preparation thereof. The said dyestuffs are obtained according to the present invention by treating anthraquinone disulfonic acids of the formula

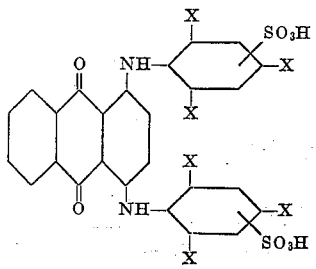

wherein X denotes ethyl or methyl, with chlorine or bromine in sulfuric acid solution.

As starting materials, use may be made, for example, of the disulfonic acids of 1,4-di-(2',4',6'-trimethyl)-phenylaminoanthraquinone, 1,4 - di - (2'-ethyl-4',6'-dimethyl)-phenylaminoanthraquinone, 1,4 - di-(2',4',6'-triethyl)-phenylaminoanthraquinone, etc.

The starting materials are obtained by dissolving the corresponding unsulfonated dyestuffs in sulfuric acid monohydrate and by treating the solution at a moderate temperature with fuming sulfuric acid until a sample is soluble without residue in cold water.

The halogenation of the sulfonation product is likewise carried out in sulfuric acid solution, said solution being obtained by dissolving the anthraquinone disulfonic acids in sulfuric acid monohydrate. It can, however, advantageously be carried out directly in the sulfonation mass after the sulfonation of the dyestuff bases. The sulfonation product is halogenated by the addition of bromine or by introducing chlorine into the reaction solution. It is advantageous to carry out these operations in the presence of free sulfur trioxide and at a temperature from about −10° C. to about +20° C. Under these conditions the halogenation requires several hours. At the most, two halogen atoms are taken up, yet nevertheless improved fastness to fulling compared with the non-halogenated dyestuff is already obtained if only one atom of halogen is introduced. Also, even less than one halogen atom can lead to an improvement of the fastness to fulling, e. g. 0.5 to 1.0 atom of halogen, whereby a product is obtained which consists of a mixture of a halogenated and a non-halogenated dyestuff. As soon as the desired degree of halogenation is obtained, the dyestuffs are isolated, for example, by pouring into ice or salt water, filtration, washing until neutral, and drying. The acid filter cake can be neutralised by making into a paste with alkali, as, for example, lithium carbonate, sodium carbonate or potassium carbonate or ammonia, and then drying.

The following examples illustrate the invention without limiting it. The parts denote parts by weight, the percentages percentages by weight and the temperatures are given in ° C.

Example 1

The reaction mixture which is obtained by dissolution of 250 parts of 1,4-di-(2',4',6'-trimethyl)-phenylaminoanthraquinone in 1380 parts of sulfuric acid monohydrate at 20–25°, subsequent treatment of the solution with 770 parts of 27% oleum whereby the temperature rises to 38–40° and stirring until a sample is completely soluble in cold water, is cooled to 0°, and 67.5 parts of 65% oleum and 42 parts of bromine are added one after the other. After stirring for 3 hours at 0°–1°, the bromine will have disappeared. The mass is stirred for a further 2 hours at this temperature and is carefully poured into a stirred mixture of 3000 parts of ice, 3000 parts of water and 600 parts of sodium chloride, whereby the temperature of the precipitation mixture rises from −10 to 20°. The reaction product is then filtered off with suction, taken up in 500 parts of water at 50°, neutralised with 600 parts of 30% sodium hydroxide solution, and the dyestuff precipitated at 90° by the addition of 500 parts of sodium chloride. The mixture is allowed to cool to 50°, the dyestuff filtered off with suction, washed with 1000 parts of 5% sodium chloride solution, and dried. A dyestuff is obtained which dyes wool from neutral to weakly acid baths in reddish-blue shades of good fastness to fulling and to light and which reserves cotton. It contains 0.62 atomic proportion of bromine and 2 atomic proportions of sulfur to one molecular proportion of the dyestuff.

The enhancement of the fastness to fulling of the new product vis-à-vis the unbrominated one is due to the portion of the dyestuff corresponding to the formula

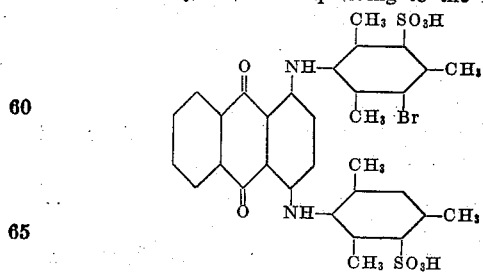

which is present in the dyestuff mixture.

A dyestuff with similar properties is obtained if the 250 parts of the dyestuff base 1,4-di-(2',4',6'-trimethyl)-phenylaminoanthraquinone used for the preparation of the reaction mixture are replaced by 265 parts of 1,4-di-(2'-ethyl-4',6'-dimethyl)-phenylaminoanthraquinone.

Example 2

The reaction mixture obtained according to Example 1 from 250 parts of 1,4-di-(2',4',6'-trimethyl)-phenylaminoanthraquinone, after cooling to 0°, is treated dropwise with 167 parts of 65% oleum followed by 102 parts of bromine. It is stirred for 12 hours at 0–2° whereby the bromine is completely taken up. The reaction product is isolated by pouring into 7500 parts of 5% potassium chloride solution and filtration. A dyestuff is obtained the dyeings of which on wool are characterised by very good wet fastness properties. Its shade is a more reddish-blue than that of the dyestuff of Example 1; cotton is reserved. Analysis shows that this product contains 2 atoms of bromine and 2 atoms of sulfur. It corresponds to the formula

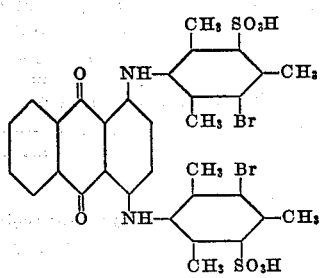

If for the preparation of the reaction mixture 265 parts of 1,4 - di - (2'-ethyl-4',6'-dimethyl)-phenylaminoanthraquinone are used instead of 250 parts of 1,4-di-(2',4',6'-trimethyl)-phenylaminoanthraquinone, then a dyestuff is obtained which dyes wool in reddish-blue shades and has similar properties.

Example 3

The reaction mixture obtained by sulfonation of 250 parts of 1,4 - di-(2',4',6' - trimethyl)-phenylaminoanthraquinone according to the first part of Example 1, is cooled to 0° after water solubility of the sulfonation product has been obtained. Thereupon the product is brominated by the dropwise addition of 110 parts of 65% oleum and 63 parts of bromine while stirring for 8 hours at 0–1°. The reaction mass is then poured with vigorous stirring into 7500 parts of 10% sodium chloride solution. The separated dyestuff is filtered off by suction, and worked up after the manner described in Example 1. The dyestuff contains 1 atom of bromine and 2 atoms of sulfur. It corresponds to the formula

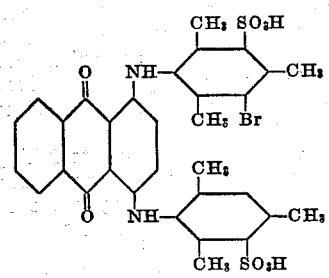

and dyes wool from neutral to weakly acid baths in reddish-blue shades having good fastness to fulling and to light. Cotton is reserved.

If the 250 parts of 1,4-di-(2',4',6'-trimethyl)-phenylaminoanthraquinone used for the preparation of the reaction mixture are replaced by 272 parts of 1,4-di-(2',4',6'-triethyl)-phenylaminoanthraquinone, a dyestuff with similar fastness properties is obtained.

Example 4

41 parts of 1,4-di-(2',4',6'-triethyl)-phenylaminoanthraquinone-disulfonic acid are dissolved in 280 parts of sulfuric acid monohydrate. The solution is cooled to 0° and 20 parts of 65% oleum and then 10.4 parts of bromine are added dropwise and the product stirred for another 6 hours at 1–3° whereby the bromine is completely consumed. The dyestuff is isolated by careful pouring and stirring into 1000 parts of 10% sodium chloride solution and filtration. A dyestuff is obtained which dyes wool from neutral to weakly acid baths in blue-violet shades and which reserves cotton. The dyeings have good fastness to fulling and to light. The product contains 2 atoms of sulfur and nearly 2 atoms of bromine, and corresponds predominantly to the formula

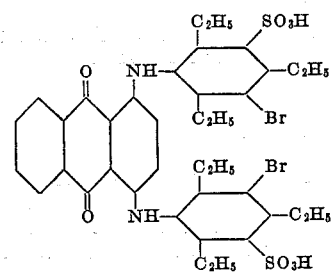

Example 5

25 parts of 1,4-di-(2',4',6'-trimethyl)-phenylaminoanthraquinone are dissolved with stirring in 138 parts of sulfuric acid monohydrate and sulfonated after the addition of 77 parts of 25% oleum while stirring for half an hour at 38°. A sample is then soluble in cold water, as also in 15% sulfuric acid, without residue. When this state is reached the sulfonation mixture is cooled to 0° and 13 parts of 65% oleum added dropwise thereto. The product is now stirred in a gentle stream of chlorine until a sample has become insoluble in 15% sulfuric acid. This state is reached after 18 hours. The chlorination product is thereupon poured into 700 parts of cold water, whereby the temperature rises to 62°, the dyestuff filtered off and worked up into the form of the free dyestuff acid. A dyestuff is obtained which dyes wool from neutral to weakly acid baths in reddish-blue shades of good fastness to fulling and to light and leaves cotton in the white condition. It contains 1.84 atoms of chlorine and 2 atoms of sulfur and corresponds predominantly to the formula

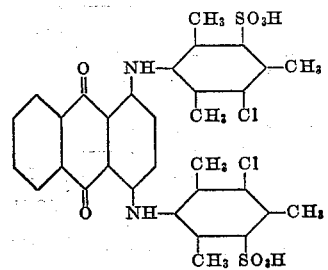

Example 6

A sulfonation mixture prepared according to the data shown in Example 5 from 100 parts of 1,4-di-(2',4',6'-trimethyl)-phenylaminoanthraquinone is treated with 150 parts of 65% oleum and 42 parts of bromine at 0–2°, and stirred for 16 hours at 0°. A small excess of bromine is removed by blowing air through the product at below 4°. Thereupon the reaction mixture is poured into a vigorously stirred mixture of 2500 parts of ice, 2000 parts of water and 500 parts of ammonium chloride. The separated dyestuff is filtered off and washed with a solution of 950 parts of water, 50 parts of 35% hydrochloric acid and 100 parts of ammonium chloride until no more sulfate ions are detectable in the filtrate. The filter cake is neutralised with 25% ammonia solution and thereupon dried. A dyestuff is obtained which corresponds to the formula

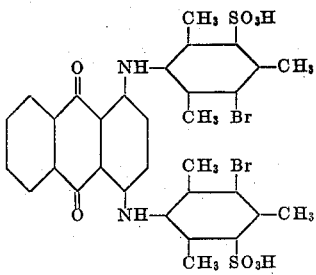

and dyes wool, nylon and Perlon from neutral to acid baths in reddish-blue shades of outstanding wet fastness properties.

*Example 7*

A dye-bath is prepared with a dyestuff solution from 1 part of the dyestuff obtained according to Example 3, first paragraph, 6000 parts of distilled water, 10 parts of anhydrous sodium sulfate and 1.5 parts of 100% acetic acid. 100 parts of wool are introduced at 50–60° and the bath is brought up to the boil in ½ hour. After boiling for ½ hour, 1.5 parts of 100% acetic acid are added thereto and the product boiled for another 30 minutes. The dye-bath is exhausted. The dyed material is washed and dried.

For dyeing silk, nylon or Perlon the bath is heated only to 90–95°.

*Example 8*

2 parts of the dyestuff obtained according to Example 6 are dissolved in 8000 parts of distilled water at 40–50°. 100 parts of nylon are then introduced into the dye-bath which is then heated in the course of ½ hour to 90–95° and the dyeing carried out for 30 minutes under neutral conditions. 5 parts of 10% acetic acid are then added to the bath and dyeing continued for a further 15 minutes. After a fresh addition of 5 parts of 10% acetic acid the material to be dyed is stirred around for another 15 minutes and thereupon the bath again treated with 5 parts of 10% acetic acid. After a further ¼ hour the bath is exhausted. The dyed material is washed and dried.

Perlon is dyed according to the same process.

Having thus disclosed the invention, what is claimed is:

1. A process for the manufacture of dyestuffs of the anthraquinone series which comprises the step of treating in sulfuric acid solution at a temperature from about −10° C. to about +20° C. and in the presence of free sulfur trioxide an anthraquinone-disulfonic acid corresponding to the formula

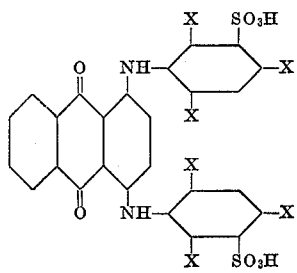

wherein each X stands for the same member selected from the group consisting of methyl and ethyl, with at least one and at most two atomic proportions of a halogen selected from the group consisting of chlorine and bromine.

2. The process for the manufacture of a dyestuff of the anthraquinone series which comprises the step of treating in sulfuric acid solution at a temperature from about −10° C. to about +20° C. and in the presence of free sulfur trioxide one molecular proportion of 1,4-di-(2',4',6'-trimethyl)-phenylaminoanthraquinone-disulfonic acid corresponding to the formula

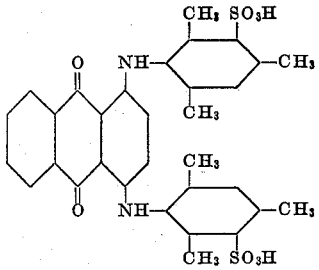

with one atomic proportion of bromine.

3. The process for the manufacture of a dyestuff of the anthraquinone series which comprises the step of treating in sulfuric acid solution at a temperature from about −10° C. to about +20° C. and in the presence of free sulfur trioxide one molecular proportion of 1,4-di - (2',4',6' - trimethyl) - phenylanthraquinone-disulfonic acid corresponding to the formula

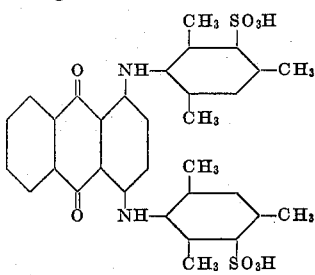

with two atomic proportions of bromine.

4. The process for the manufacture of a dyestuff of the anthraquinone series which comprises the step of treating in sulfuric acid solution at a temperature from about −10° C. to about +20° C. and in the presence of free sulfur trioxide one molecular proportion of 1,4-di - (2',4',6' - triethyl) - phenylaminoanthraquinone - disulfonic acid corresponding to the formula

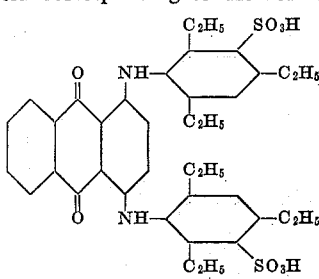

with two atomic proportions of bromine.

5. The process for the manufacture of a dyestuff of the anthraquinone series which comprises the step of treating in sulfuric acid solution at a temperature from about −10° C. to about +20° C. and in the presence of free sulfur trioxide one molecular proportion of 1,4-di-(2',4',6'-triethyl)-phenylaminoanthraquinone-disulfonic acid corresponding to the formula

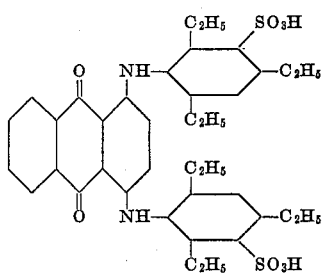

with an excess of chlorine.

6. A dyestuff of the anthraquinone series which is fast to milling, obtained by treating in sulfuric acid solution and in the presence of free sulfur trioxide an anthraquinone-disulfonic acid corresponding to the formula

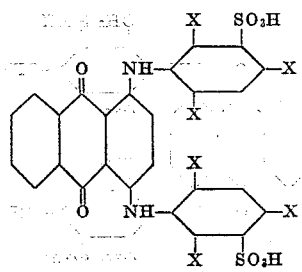

wherein each X stands for the same member selected from the group consisting of methyl and ethyl, with at least one and at most two atomic proportions of a halogen selected from the group consisting of chlorine and bromine.

7. The dyestuff of the anthraquinone series which is fast to milling, obtained by treating in sulfuric acid solution at a temperature from about $-10°$ C. to about $+20°$ C. and in the presence of free sulfur trioxide one molecular proportion of 1,4-di-(2',4',6'-trimethyl)-phenylaminoanthraquinone-disulfonic acid corresponding to the formula

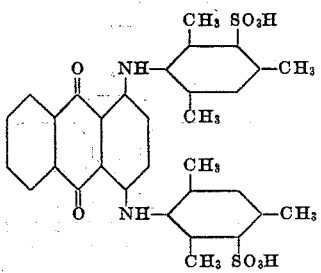

with one atomic proportion of bromine.

8. The dyestuff of the anthraquinone series which is fast to milling, obtained by treating in sulfuric acid solution at a temperature from about $-10°$ C. to about $+20°$ C. and in the presence of free sulfur trioxide one molecular proportion of 1,4-di-(2',4',6'-trimethyl)-phenylaminoanthraquinone-disulfonic acid corresponding to the formula

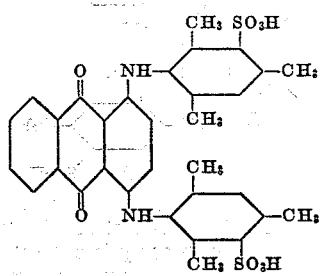

with two atomic proportions of bromine.

9. The dyestuff of the anthraquinone series which is fast to milling, obtained by treating in sulfuric acid solution at a temperature from about $-10°$ C. to about $+20°$ C. and in the presence of free sulfur trioxide one molecular proportion of 1,4-di-(2',4',6'-triethyl)-phenylaminoanthraquinone-disulfonic acid corresponding to the formula

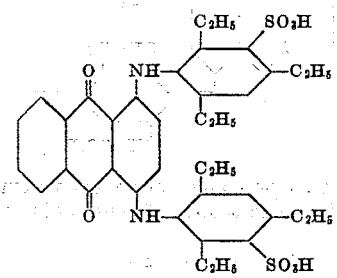

with two atomic proportions of bromine.

10. The dyestuff of the anthraquinone series which is fast to milling, obtained by treating in sulfuric acid solution at a temperature from about $-10°$ C. to about $+20°$ C. and in the presence of free sulfur trioxide one molecular proportion of 1,4-di-(2',4',6'-triethyl)-phenylaminoanthraquinone-disulfonic acid corresponding to the formula

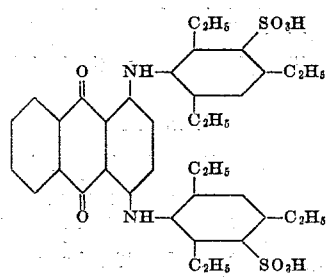

with an excess of chlorine.

References Cited in the file of this patent
UNITED STATES PATENTS

| | | |
|---|---|---|
| 2,226,909 | Peter | Dec. 31, 1940 |
| 2,236,672 | Coffey et al. | Apr. 1, 1941 |
| 2,377,145 | Gutzwiller | May 29, 1945 |

FOREIGN PATENTS

| | | |
|---|---|---|
| 630,592 | Great Britain | Oct. 17, 1949 |